(12) United States Patent
Guo

(10) Patent No.: US 12,160,831 B2
(45) Date of Patent: Dec. 3, 2024

(54) REFERENCE SIGNAL DETERMINATION METHOD AND DEVICE, AND UE

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 502 days.

(21) Appl. No.: 17/559,389

(22) Filed: Dec. 22, 2021

(65) Prior Publication Data

US 2022/0116882 A1  Apr. 14, 2022

Related U.S. Application Data

(63) Continuation of application No. PCT/CN2020/111082, filed on Aug. 25, 2020.

(60) Provisional application No. 62/907,210, filed on Sep. 27, 2019.

(51) Int. Cl.
| | |
|---|---|
| *H04W 52/14* | (2009.01) |
| *H04L 5/00* | (2006.01) |
| *H04W 16/28* | (2009.01) |
| *H04W 52/24* | (2009.01) |
| *H04W 80/02* | (2009.01) |

(52) U.S. Cl.
CPC ......... *H04W 52/146* (2013.01); *H04L 5/0051* (2013.01); *H04W 16/28* (2013.01); *H04W 52/242* (2013.01); *H04W 80/02* (2013.01)

(58) Field of Classification Search
CPC . H04W 52/146; H04W 16/28; H04W 52/242; H04W 80/02; H04L 5/0051
See application file for complete search history.

(56) References Cited

U.S. PATENT DOCUMENTS

2020/0178280 A1\*  6/2020  Guan ................... H04B 7/0626

FOREIGN PATENT DOCUMENTS

| CN | 102638894 A | 8/2012 |
|---|---|---|
| CN | 109392144 A | 2/2019 |
| EP | 2770785 A1 | 8/2014 |

OTHER PUBLICATIONS

ZTE et al. MAC CE for activation/deactivation of semi-persistent SRS 3GPP TSG RAN WG2 Meeting #101 R2-1801932 Mar. 2, 2018(Mar. 2, 2018), entire document.
International Search Report in the international application No. PCT/CN2020/111082, mailed on Dec. 1, 2020.

(Continued)

*Primary Examiner* — Justin Y Lee
(74) *Attorney, Agent, or Firm* — Ladas & Parry, LLP

(57) ABSTRACT

A reference signal determination method includes: receiving, by UE, first configuration information. The first configuration information is used for determining configuration information of a Sounding Reference Signal (SRS) resource set, the configuration information of the SRS resource set includes first indication information for indicating an index of a first reference signal source, and the first reference signal resource is used for estimating a pathloss of a first SRS resource of the SRS resource set.

18 Claims, 9 Drawing Sheets

UE receives first configuration information, where the first configuration information is used for determining configuration information of an SRS resource set, the configuration information of the SRS resource set includes first indication information for indicating an index of a first reference signal source, and the first reference signal resource is used for estimating a pathloss of a first SRS resource of the SRS resource set    201

(56) References Cited

OTHER PUBLICATIONS

Written Opinion of the International Search Authority in the international application No. PCT/CN2020/111082, mailed on Dec. 1, 2020.
3GPP TS 38.211 V15.5.0 (Mar. 2019), Mar. 2019, Technical Specification 3rd Generation Partnership Project, Technical Specification Group Radio Access Network;" NR;Physical channels and modulation," entire document.
3GPP TS 38.212 V15.5.0(Mar. 2019), Mar. 2019, Technical Specification 3rd Generation Partnership Project; Technical Specification Group Radio Access Network;"NR; Multiplexing and channel coding," entire document.
3GPP TS 38.213 V15.5.0 (Mar. 2019), Mar. 2019, Technical Specification 3rd Generation Partnership Project; Technical Specification Group Radio Access Network;"NR; Physical layer procedures for control," entire document.
3GPP TS 38.214 V15.5.0(Mar. 2019), Mar. 2019, Technical Specification 3rd Generation Partnership Project; Technical Specification Group Radio Access Network; "NR; Physical layer procedures for data," entire document.
3GPP TS 38.215 V15.5.0(Mar. 2019), Mar. 2019, Technical Specification 3rd Generation Partnership Project; Technical Specification Group Radio Access Network;"NR; Physical layer measurements," entire document.
3GPP TS 38.321 V15.5.0(Mar. 2019), Mar. 2019, Technical Specification 3rd Generation Partnership Project; Technical Specification Group Radio Access Network; "NR; Medium Access Control (MAC) protocol specification," entire document.
3GPP TS 38.331 V15.5.0(Mar. 2019), Mar. 2019, Technical Specification 3rd Generation Partnership Project; Technical Specification Group Radio Access Network, "NR; Radio Resource Control (RRC) protocol specification," entire document.

* cited by examiner

UE receives first configuration information, where the first configuration information is used for determining configuration information of an SRS resource set, the configuration information of the SRS resource set includes first indication information for indicating an index of a first reference signal source, and the first reference signal resource is used for estimating a pathloss of a first SRS resource of the SRS resource set ⟋ 201

FIG. 2

| A/D | Serving Cell ID | BWP ID | Oct 1 |
|---|---|---|---|
| $c_1$ | | $c_0$ | Oct 2 |
| $c_3$ | | $c_2$ | Oct 3 |
| $c_5$ | | $c_4$ | Oct 4 |

...

| $c_{2N}$ | $c_{2N-1}$ | Oct N+1 |
|---|---|---|

FIG. 4

REFERENCE SIGNAL DETERMINATION METHOD AND DEVICE, AND UE

CROSS-REFERENCE TO RELATED APPLICATIONS

The application is a continuation application of PCT Application No. PCT/CN2020/111082 filed on Aug. 25, 2020, which claims priority to, and the benefit of, U.S. Provisional Patent Application No. 62/907,210 filed on Sep. 27, 2019, which are hereby incorporated by reference in their entireties.

BACKGROUND

In the current method, the pathloss reference signal used to estimate the path loss for transmission of PUSCH or transmission of SRS resources in a SRS set is semi-statically configured through RRC signaling. In real deployment scenario, changing path loss would require RRC configuration or reconfiguration. The consequence is large configuration latency and great signaling overhead. It could even cause service interruption.

SUMMARY

The present disclosure relates to the technical field of mobile communications, and particularly, to a reference signal determination method and device, and user equipment (UE).

Embodiments of the disclosure provide a reference signal determination method and device, and UE.

Embodiments of the disclosure provide a reference signal determination method, including: receiving, by User Equipment (UE), first configuration information, wherein the first configuration information is used for determining configuration information of a Sounding Reference Signal (SRS) resource set, the configuration information of the SRS resource set comprises first indication information for indicating an index of a first reference signal source, and the first reference signal resource is used for estimating a pathloss of a first SRS resource of the SRS resource set.

Embodiments of the disclosure provide a reference signal determination device for User Equipment (UE), including a memory storing processor-executable instructions, and a processor. The processor is configured to execute the stored processor-executable instructions to perform an operation of: receiving first configuration information, wherein the first configuration information is used for determining configuration information of a Sounding Reference Signal (SRS) resource set, the configuration information of the SRS resource set comprises first indication information for indicating an index of a first reference signal source, and the first reference signal resource is used for estimating a pathloss of a first SRS resource of the SRS resource set.

Embodiments of the disclosure provide a non-transitory computer-readable storage medium having stored thereon computer-executable instructions that, when executed by a processor of User Equipment (UE), cause the processor to perform a reference signal determination method, the method including: receiving, by the UE, first configuration information, wherein the first configuration information is used for determining configuration information of a Sounding Reference Signal (SRS) resource set, the configuration information of the SRS resource set comprises first indication information for indicating an index of a first reference signal source, and the first reference signal resource is used for estimating a pathloss of a first SRS resource of the SRS resource set.

BRIEF DESCRIPTION OF THE DRAWINGS

The accompanying drawings described herein are used to provide a further understanding of the present disclosure, and form a part of the present disclosure. Exemplary embodiments of the present disclosure and descriptions thereof are used to explain the present disclosure, and do not constitute any inappropriate limitation to the present disclosure. In the accompanying drawings:

FIG. 2 is a first schematic flowchart of a reference signal determination method according to an embodiment of the disclosure.

FIG. 4 is a schematic diagram of an MAC CE according to an embodiment of the disclosure.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a 5G communication system or a future communication system.

Figure 1:
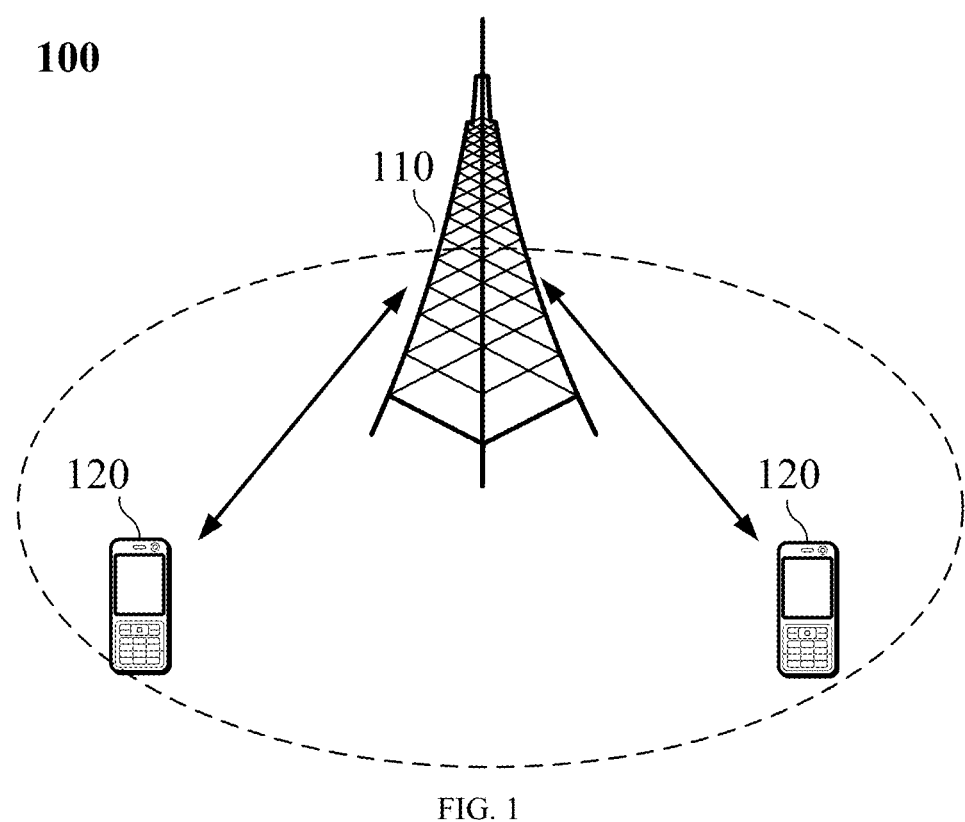
FIG. 1 is a schematic diagram showing an architecture of a communication system according to an embodiment of the disclosure.

Exemplarily, the communication system 100 to which the embodiments of the present disclosure is applied is illustrated in FIG. 1. The communication system 100 may include a network device 110, which may be a device communicating with a terminal 120 (also referred to as a communication terminal, terminal). The network device 110 may provide communication coverage for a specific geographic area and may communicate with a terminal located within the coverage area. Alternatively, the network device 110 can be an Evolutional base station (Evolutional Node B, eNB or eNodeB) or a wireless controller in network in a cloud radio access network (CRAN) in an LTE system, or the network device can be mobile switching center, relay station, access point, on-board equipment, wearable equipment, hub, switch, bridge, router, network-side device in 5G network or network device in a future communication system, etc.

The communication system 100 also includes at least one terminal 120 located within the coverage of the network device 110. The "terminal" used herein includes but is not limited to the connection via wired lines, such as public switched telephone networks (PSTN) and digital subscriber lines Line, DSL, digital cable, direct cable connection; and/or another data connection/network; and/or via wireless interface, such as for cellular network, wireless local area network (WLAN), such as DVB-H Digital television network, satellite network, AM-FM broadcast transmitter of the network; and/or device set to receive/send communication signals of another terminal; and/or Internet of things (IOT) device. A terminal set to communicate via a wireless interface may be referred to as a "wireless communication terminal", "wireless terminal" or "mobile terminal". Examples of mobile terminals include, but are not limited to, satellites or cellular phones; personal communications systems that can combine cellular radiotelephony with data processing, fax, and data communication capabilities System (PCS) terminals; PDAs that may include radiophones, pagers, Internet/intranet access, web browsers, notebooks, calendars, and/or global positioning system (GPS) receivers; and conventional laptop and/or handheld receivers or other electronic devices including radiophone transceivers. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

In at least one embodiment, the terminal device 120 may perform Device to Device (D2D) communication.

In at least one embodiment, the 5G system or network may also be called an NR system or network.

FIG. 1 exemplarily shows one communication device and two terminals. Alternatively, the communication system 100 may include multiple network devices and each communication device may have another number of terminals in its coverage, which is not limited in the embodiments of the disclosure.

Alternatively, the communication system 100 may further include other network entities such as a network controller, a mobility management entity and the like, which is not limited in the embodiments of the disclosure.

It is to be noted that a device having a communication function in a network/system according to embodiments of the disclosure can be referred to as a communication device. Taking the communication system 100 shown in FIG. 1 as an example, the communication device may include a network device 110 and a terminal that have a communication function. The network device 110 and the terminal 120 may be the specific device described above, which will not elaborated herein. The communication device may further include other devices in the communication system 100, for example other network entities such as a network controller, a mobility management entity and the like, which is not limited in the embodiments of the disclosure.

It is to be understood that terms "system" and "network" in the disclosure may usually be exchanged in the disclosure. In the disclosure, the term "and/or" is only an association relationship describing associated objects and represents that three relationships may exist. For example, A and/or B may represent three conditions: i.e., independent existence of A, existence of both A and B and independent existence of B. In addition, the character "/" in the disclosure usually represents that previous and next associated objects form an "or" relationship.

For better understanding of the technical solutions disclosed in the embodiments of the disclosure, the technical solutions according to embodiments of the disclosure are elaborated below.

NR/5G system supports uplink power control on uplink PUSCH transmission and SRS transmission. For an uplink transmission, the UE generally calculates the transmit power as:

$$P = \min\{P_{CMAX}, \{P_0 + \alpha \times PL + f + 10 \log_{10} M + \Delta\}\}.$$

$P_{C\ MAX}$ is the maximal allowed transmit power. $P_0$ is the target received signal power level of open-loop power control operation. The choice of $P_0$ is based on the expected target SINR and level of interference at the network side. Larger value of $P_0$ means higher uplink transmit power and thus greater SINR value at the receiver side, but it could cause more interference to other cells. PL is the pathloss estimate. The pathloss is estimated based on measuring some downlink reference signal. The pathloss is calculated as pathloss=reference signal power−L3-filtered RSRP. f is the power control adjustment state for of closed-loop power control operation. $10 \log_{10} M$ is the power adjustment parameter that takes into account the size of bandwidth of resource allocation of the uplink transmission and $\Delta$ is the power control adjustment parameter related with uplink transmission format, for example MCS level used by the PUSCH transmission.

In the RRC configuration of PUSCH and SRS, a downlink reference signal (CSI-RS resource or SS/PBCH block) is configured as pathloss reference signal that is used to estimate the pathloss for uplink power control.

For SRS power control, the power control parameters including pathloss reference signal are configured per SRS resource set. In one SRS resource set, the UE can be configured with one or more SRS resources. For one transmission of each SRS resource in the set, the UE shall use the power control parameters including pathloss reference signal to determine the transmit power for that SRS resource. Particularly, in the RRC configuration of one SRS resource set SRS_config, the power control parameters including pathloss reference signal are configured as follows:

TABLE 1

```
SRS-ResourceSet ::=        SEQUENCE {
  srs-ResourceSetId           SRS-ResourceSetId,
  srs-ResourceIdList                                    SEQUENCE
(SIZE(1..maxNrofSRS-ResourcesPerSet))    OF      SRS-ResourceId
OPTIONAL, -- Cond Setup
  resourceType                CHOICE {
    aperiodic                           SEQUENCE {
      aperiodicSRS-ResourceTrigger                      INTEGER
(1..maxNrofSRS-TriggerStates-1),
      csi-RS
NZP-CSI-RS-ResourceId                                OPTIONAL,
-- Cond NonCodebook
      slotOffset                                       INTEGER
(1..32)                     OPTIONAL, -- Need S
      ...,
      [[
      aperiodicSRS-ResourceTriggerList-v1530
SEQUENCE (SIZE(1..maxNrofSRS-TriggerStates-2))
                                                            OF
INTEGER (1..maxNrofSRS-TriggerStates-1) OPTIONAL -- Need M
      ]]
    },
    semi-persistent             SEQUENCE {
      associatedCSI-RS
NZP-CSI-RS-ResourceId                                OPTIONAL,
-- Cond NonCodebook
      ...
    },
    periodic                    SEQUENCE {
      associatedCSI-RS
NZP-CSI-RS-ResourceId                                OPTIONAL,
-- Cond NonCodebook
      ...
    }
  },
  usage                                             ENUMERATED
{beamManagement, codebook, nonCodebook, antennaSwitching},
  alpha                                                   Alpha
OPTIONAL, -- Need S
  p0                          INTEGER (-202..24)
OPTIONAL, -- Cond Setup
  pathlossReferenceRS         CHOICE {
    ssb-Index                           SSB-Index,
    csi-RS-Index
NZP-CSI-RS-ResourceId
  }
OPTIONAL, -- Need M
  srs-PowerControlAdjustmentStates             ENUMERATED {
sameAsFci2, separateClosedLoop}    OPTIONAL, -- Need
S
  ...
}
``` where the RRC parameter pathlossReferenceRS configures one CSI-RS resource index or SS/PBCH block index that provides the downlink reference signal resource index for pathloss estimate.

For a PUSCH transmission scheduled by DCI format 0_1, the power parameters including pathloss reference signals are configured through RRC parameter PUSCH-PowerControl. The parameter PUSCH-PowerControl includes multiple entries of SRI-PUSCH-PowerControls, in each of which a set of power control parameters including a pathloss reference signal are configured. Each entry of SRI-PUSCH-PowerControls corresponds to one codepoint of SRI field in DCI format 0_1. For one PUSCH transmission scheduled by DCI format 1_0, the UE can derive the pathloss reference signal according the codepoint of SRI field in the scheduling DCI format 0_1 and the mapping between SRI codepoint and PUSCH pathloss reference signals configured by RRC parameters. Then the UE can estimate the pathloss based on the determined pathloss reference signal and then determine the transmit power. The pathloss reference signal for PUSCH is configured by RRC parameter as follows:

TABLE 2

```
PUSCH-PowerControl ::=             SEQUENCE {
  tpc-Accumulation                 ENUMERATED { disabled }
OPTIONAL, -- Need S
  msg3-Alpha                                       Alpha
OPTIONAL, -- Need S
  p0-NominalWithoutGrant           INTEGER (-202..24)
OPTIONAL, -- Need M
  p0-AlphaSets                              SEQUENCE (SIZE
(1..maxNrofP0-PUSCH-AlphaSets)) OF P0-PUSCH-AlphaSet
OPTIONAL, -- Need M
  pathlossReferenceRSToAddModList            SEQUENCE (SIZE
(1..maxNrofPUSCH-PathlossReferenceRSs))                 OF
PUSCH-PathlossReferenceRS
OPTIONAL, -- Need N
  pathlossReferenceRSToReleaseList           SEQUENCE (SIZE
(1..maxNrofPUSCH-PathlossReferenceRSs))                 OF
PUSCH-PathlossReferenceRS-Id
```

TABLE 2-continued

```
OPTIONAL, -- Need N
    twoPUSCH-PC-AdjustmentStates      ENUMERATED {twoStates}
OPTIONAL, -- Need S
    deltaMCS                          ENUMERATED {enabled}
OPTIONAL, -- Need S
    sri-PUSCH-MappingToAddModList              SEQUENCE (SIZE
(1..maxNrofSRI-PUSCH-Mappings)) OF SRI-PUSCH-PowerControl
OPTIONAL, -- Need N
    sri-PUSCH-MappingToReleaseList             SEQUENCE (SIZE
(1..maxNrofSRI-PUSCH-Mappings)) OF SRI-PUSCH-PowerControlId
OPTIONAL -- Need N
}
SRI-PUSCH-PowerControl ::=      SEQUENCE {
    sri-PUSCH-PowerControlId
SRI-PUSCH-PowerControlId,
    sri-PUSCH-PathlossReferenceRS-Id
PUSCH-PathlossReferenceRS-Id,
    sri-P0-PUSCH-AlphaSetId         P0-PUSCH-AlphaSetId,
    sri-PUSCH-ClosedLoopIndex       ENUMERATED { i0, i1 }
}
``` where each SRI-PUSCH-PowerControl configures one sri-PUSCH-PathlossReferenceRS-Id that is mapped with one codepoint of SRI field in the DCI format scheduling PUSCH transmission.

In the current method, the pathloss reference signal used to estimate the path loss for transmission of PUSCH or transmission of SRS resources in a SRS set is semi-statically configured through RRC signaling. In real deployment scenario, changing path loss would require RRC configuration or reconfiguration. The consequence is large configuration latency and great signaling overhead. It could even cause service interruption. Therefore, in Rel-16, how to update path loss reference signals for PUSCH and SRS is discussed and there is no detailed solution yet. Detailed solution on updating path loss reference signals for PUSCH and SRS through low-latency and low-overhead signaling overhead are provided. Technical solutions according to embodiments of the disclosure are elaborated as follows.

FIG. 2 is a first schematic flowchart of a reference signal determination method according to an embodiment of the disclosure. As shown in FIG. 2, the method includes an operation 201.

In operation 201, UE receives first configuration information, where the first configuration information is used for determining configuration information of a Sounding Reference Signal (SRS) resource set, the configuration information of the SRS resource set includes first indication information for indicating an index of a first reference signal source, and the first reference signal resource is used for estimating a pathloss of a first SRS resource of the SRS resource set.

The technical solution of the embodiment of the disclosure is intended to determine a pathloss reference signal for SRS transmission. Herein, the pathloss reference signal is a reference signal used for estimating the pathloss.

In an embodiment, the configuration information of the SRS resource set includes the first indication information In a possible implementation, the first indication information may be SRS-PathlossReferenceRS-Id, and the SRS-PathlossReferenceRS-Id is used for indicating SRS-PathlossReferenceRS. Furthermore, the SRS-PathlossReferenceRS is used for configuring an index of a reference signal resource. Herein, the index of the reference signal resource is for example SS/PBCH block index of CSI-RS resource index.

In another implementation, the first indication information may be an index of a reference signal resource. Herein, the index of the reference signal resource is for example SS/PBCH block index or CSI-RS resource index.

It should be noted that embodiments of the disclosure are not limited to a fact that the first indication information indicates a reference signal resource; instead, the first indication information may indicate a list of reference signal resources.

In the embodiments of the disclosure, the first SRS resource may include a periodic SRS resource, a semi-persistent SRS resource or an aperiodic SRS resource. In practical implementations, the type of the first SRS resource can be set by setting a higher layer parameter resourceType of the first SRS resource to be "periodic", "semi-persistent" or "aperiodic". How to determine the reference signal resource for estimating the pathloss will be described based on different types of first SRS resources.

Periodic First SRS Resource

The UE estimates the pathloss of the first SRS resource based on the index of the first reference signal source, which is indicated by the first indication information According to some embodiments, the UE receives a first MAC CE command that contains spatial relation assumptions, the spatial relation assumptions being used for determining spatial relation information of SRS resources in the SRS resource set, where the spatial relation assumptions are provided by a list of reference signal IDs.

Semi-Persistent First SRS Resource

In a possible implementation, in a case where the UE receives a first activation command for activating the first SRS resource, 1) in response to that the first activation command contains second indication information for indicating an index of a second reference signal resource, the UE estimates the pathloss of the first SRS resource based on the index of the second reference signal source, which is indicated by the second indication information; or 2) in response to that the first activation command does not contain the second indication information for indicating the index of the second reference signal resource, the UE estimates the pathloss of the first SRS resource based on the index of the first reference signal source, which is indicated by the first indication information.

In a possible implementation, in a case where the UE does not receive the first activation command, and in response to that the configuration information of the SRS resource set does not comprise the first indication information, A) the UE estimates the pathloss of the first SRS resource based on a third reference signal resource, the third reference signal resource being a reference signal resource used to obtain Master System Information (MIB); or B) the UE estimates the pathloss of the first SRS resource based on a fourth reference signal resource, the fourth reference signal resource being configured through a first Transmission Configuration Indicator-state (TCI-state).

Herein, according to some embodiments, the first TCI-state is used for determining a downlink beam of a PDSCH, wherein the PDSCH is used for carrying the first activation command; the first TCI-state is used for determining a downlink beam of a CORESET, wherein the CORESET is used for transmitting scheduling information of a PDSCH carrying the first activation command.

Aperiodic First SRS Resource

The UE receives a second MAC CE command that contains spatial relation assumptions, the spatial relation assumptions being used for determining spatial relation information of SRS resources in the SRS resource set, where the spatial relation assumptions are provided by a list of reference signal IDs.

In a possible implementation, in response to that the second MAC CE command contains third indication information for indicating an index of a third reference signal resource, the UE estimates the pathloss of the first SRS resource based on the index of the third reference signal source, which is indicated by the third indication information.

In a possible implementation, in response to that the second MAC CE command does not contain third indication information for indicating an index of a third reference signal resource, estimating, by the UE, the pathloss of the first SRS resource based on the index of the first reference signal source, which is indicated by the first indication information.

In a possible implementation, in a case where the UE does not receive the second MAC CE command, and in response to that the configuration information of the SRS resource set does not comprise the first indication information, I) the UE estimates the pathloss of the first SRS resource based on a third reference signal resource, the third reference signal resource being a reference signal resource used to obtain MIB; or II) the UE estimates the pathloss of the first SRS resource based on a fourth reference signal resource, the fourth reference signal resource being configured through a first TCI-state.

Herein, according to some embodiments of the disclosure, the first TCI-state is used for determining a downlink beam of a CORESET, where the CORESET is used for transmitting first Downlink control information (DCI) for triggering transmission of the first SRS resource.

The technical solutions of the embodiments of the disclosure are elaborated below in combination with specific application examples.

First Example

For the SRS transmission in a given BWP of a serving cell, the UE can be configured with one or more SRS-PathlossReferenceRS, each of which configures a SS/PBCH block index or CSI-RS resource index that indicates one downlink reference signal resource used to estimate pathloss for SRS power control. The configuration of SRS-PathlossReferenceRS can be as follows:

TABLE 3

| | |
|---|---|
| SRS-PathlossReferenceRS ::= | SEQUENCE { |
| srs-PathlossReferenceRS-Id | |
| SRS-PathlossReferenceRS-Id, | |
| referenceSignal | CHOICE { |
| ssb-Index | SSB-Index, |
| csi-RS-Index | |
| NZP-CSI-RS-ResourceId | |
| } | |
| } | |
| SRS-PathlossReferenceRS-Id ::= | INTEGER |
| (0..maxNrofSRS-PathlossReferenceRSs-1) | |
| SRS-Config ::= | SEQUENCE { |
| srs-ResourceSetToReleaseList | SEQUENCE |
| (SIZE(1..maxNrofSRS-ResourceSets)) OF SRS-ResourceSetId | |
| OPTIONAL, -- Need N | |
| srs-ResourceSetToAddModList | SEQUENCE |
| (SIZE(1..maxNrofSRS-ResourceSets)) OF SRS-ResourceSet | |
| OPTIONAL, -- Need N | |
| srs-ResourceToReleaseList | SEQUENCE |
| (SIZE(1..maxNrofSRS-Resources)) OF SRS-ResourceId | |

TABLE 3-continued

| | |
|---|---|
| OPTIONAL, -- Need N | |
| srs-ResourceToAddModList | SEQUENCE |
| (SIZE(1..maxNrofSRS-Resources)) OF SRS-Resource | |
| OPTIONAL, -- Need N | |
| tpc-Accumulation | ENUMERATED |
| {disabled} | |
| OPTIONAL, -- Need S | |
| pathlossReferenceRSToAddModList | SEQUENCE (SIZE |
| (1..maxNrofSRS-PathlossReferenceRSs)) OF | |
| SRS-PathlossReferenceRS | |
| OPTIONAL, -- Need N | |
| pathlossReferenceRSToReleaseList | SEQUENCE (SIZE |
| (1..maxNrofSRS-PathlossReferenceRSs)) OF | |
| SRS-PathlossReferenceRS-Id | |
| OPTIONAL, -- Need N | |
| ... | |
| } | |

And in the configuration of each SRS resource set, an SRS-PathlossReferenceRS-Id is configured to indicate a SS/PBCH block index or CSI-RS resource index that provides the downlink reference signal resource used to estimate pathloss for power control on transmission of any SRS resource configured in the set:

TABLE 4

| | |
|---|---|
| SRS-ResourceSet ::= | SEQUENCE { |
| srs-ResourceSetId | SRS-ResourceSetId, |
| ... | |
| alpha | Alpha |
| OPTIONAL, -- Need S | |
| p0 | INTEGER (-202..24) |
| OPTIONAL, -- Cond Setup | |
| pathlossReferenceRS | |
| SRS-PathlossReferenceRS-Id OPTIONAL, -- Need M | |
| srs-PowerControlAdjustmentStates | ENUMERATED { |
| sameAsFci2, separateClosedLoop} | OPTIONAL, -- Need S |
| ... | |
| } | |

For a periodic SRS resource, the pathloss RS is determined as follows: For a UE configured with one or more SRS resource configurations and when the higher layer parameter resource Type in SRS-Resource is set to 'periodic':

1) The UE shall determine a SS/PBCH block index or CSI-RS resource index indicated by the higher layer parameter pathlossReferenceRS configured in the configuration of SRS resource set where the SRS resource belongs to.

2) The UE may receive a MAC CE command that contains spatial relation assumptions provided by a list of reference signal IDs for each SRS resource in a SRS resource set. The MAC CE command also contains one SRS-pathlossReferenceId for the SRS resource set in which the SRS resources are provided spatial relation assumptions. and the indicated SRS-pathlossReferenceId indicates one SRS-PathlossReferenceRS configured for SRS transmission in the given BWP of a serving cell.

For a semi-persistent SRS resource, the pathloss RS is determined as follows: For a UE configured with one or more SRS resource configurations and when the higher layer parameter resource Type in SRS-Resource is set to 'semi-persistent':

1) when a UE receives an activation command for an SRS resource, and when the HARQ-ACK corresponding to the PDSCH carrying the activation command is transmitted in slot n, the corresponding actions and the UE assumptions on SRS transmission corresponding to the configured SRS resource set shall be applied starting from the first slot that is after slot $n+3N_{slot}^{subframe,\mu}$. The activation command also contains one SRS-pathlossReferenceId for the activated SRS resource set and the indicated SRS-pathlossReferenceId indicates one SRS-PathlossReferenceRS configured for SRS transmission in the given BWP of a serving cell.

2) If the activated SRS resource set is configured with higher layer parameter pathlossReferenceRS, the UE shall assume that the ID of the downlink reference signal resource indicated by the SRS-pathlossReferenceId in the activation command overrides the one configured in pathlossReferenceRS.

3) If the activation command does not contain one SRS-pathlossReferenceId for the activated SRS resource set, the UE shall assume the higher layer parameter pathlossReferenceRS provides a SS/PBCH block index or CSI-RS resource index for pathloss estimation.

4) If the UE is not provided with the higher layer parameter pathlossReferenceRS and if the UE does not receives an activation command containing one SRS-pathlossReferenceId to indicate one pathloss RS for the activated SRS resource set, the UE shall assume the SS/PBCH block that is used to obtain MIB (master system information) is the pathloss RS for the SRS resource set.

5) In one example, if the UE is not provided with the higher layer parameter pathlossReferenceRS and if the UE does not receive a MAC CE command containing one SRS-pathlossReferenceId to indicate one pathloss RS for the activated SRS resource set:

A) If the downlink reference signal configured in TCI-state configured to PDSCH where the semi-persistent SRS activation command is carried is a SS/PBCH block or a periodic CSI-RS resource or a semi-persistent CSI-RS resource that is activated, the UE shall use that SS/PBCH block or that CSI-RS resource to estimate the pathloss used for determining transmit power for the SRS transmission of SRS resource in the triggered SRS resource set. And if the downlink reference signal configured in TCI-state configured to PDSCH where the semi-persistent SRS activation command is carried is a aperiodic CSI-RS resource or non-activated semi-persistent CSI-RS resource, the UE shall use that SS/PBCH block that is used to obtain MIB to estimate the pathloss used for determining transmit power for the SRS transmission of SRS resource in the triggered SRS resource set.

B) If the downlink reference signal configured in TCI-state configured to CORESET where the DCI scheduling the PDSCH transmission carrying the semi-persistent SRS activation command is detected is a SS/PBCH block or a periodic CSI-RS resource or a semi-persistent CSI-RS resource that is activated, the UE shall use that SS/PBCH block or that CSI-RS resource to estimate the pathloss used for determining transmit power for the SRS transmission of SRS resource in the triggered SRS resource set. And if the downlink reference signal configured in TCI-state configured to CORESET where the DCI scheduling the PDSCH transmission carrying the semi-persistent SRS activation command is detected is a aperiodic CSI-RS resource or non-activated semi-persistent CSI-RS resource, the UE shall use that SS/PBCH block that is used to obtain MIB to estimate the pathloss used for determining transmit power for the SRS transmission of SRS resource in the triggered SRS resource set.

For an aperiodic SRS resource, the pathloss RS is determined as follows: For a UE configured with one or more SRS resource configurations and when the higher layer parameter resource Type in SRS-Resource is set to 'aperiodic':

1) The UE may receive an MAC CE command that contains spatial relation assumptions provided by a list of reference signal IDs for each SRS resource is a SRS resource set. The MAC CE command also contains one SRS-pathlossReferenceId for the SRS resource set in which the SRS resources are provided spatial relation assumptions. and the indicated SRS-pathlossReferenceId indicates one SRS-PathlossReferenceRS configured for SRS transmission in the given BWP of a serving cell.

2) If the indicated SRS resource set is configured with higher layer parameter pathlossReferenceRS, the UE shall assume that the ID of the downlink reference signal resource indicated by the SRS-pathlossReferenceId in the MAC CE command overrides the one configured in pathlossReferenceRS.

3) The UE receives a downlink DCI, a group common DCI, or an uplink DCI based command where a codepoint of the DCI may trigger one or more SRS resource set(s). If the UE does not receive MAC CE command containing SRS-pathlossReferenceId for an SRS resource set, the UE assume the higher layer parameter pathlossReferenceRS provides a SS/PBCH block index or CSI-RS resource index for pathloss estimation for SRS transmission in the SRS resource set.

4) If the UE is not provided with the higher layer parameter pathlossReferenceRS and if the UE does not receives an MAC CE command containing one SRS-pathlossReferenceId to indicate one pathloss RS for a SRS resource set, the UE shall assume the SS/PBCH block that is used to obtain MIB (master system information) is the pathloss RS for the SRS resource set.

5) In one example, if the UE is not provided with the higher layer parameter pathlossReferenceRS and if the UE does not receive a MAC CE command containing one SRS-pathlossReferenceId to indicate one pathloss RS for a SRS resource set:

A) If the downlink reference signal configured in TCI-state configured to CORESET where the DCI triggering the transmission of SRS resource in the SRS set is detected is a SS/PBCH block or a periodic CSI-RS resource or a semi-persistent CSI-RS resource that is activated, the UE shall use that SS/PBCH block or that CSI-RS resource to estimate the pathloss used for determining transmit power for the SRS transmission of SRS resource in the triggered SRS resource set. And if the downlink reference signal configured in TCI-state configured to CORESET where the DCI triggering SRS transmission of SRS resource in the SRS set is detected is a aperiodic CSI-RS resource or non-activated semi-persistent CSI-RS resource, the UE shall use that SS/PBCH block that is used to obtain MIB to estimate the pathloss used for determining transmit power for the SRS transmission of SRS resource in the triggered SRS resource set.

In the first method, an example is, for the SRS transmission in a given BWP of a serving cell, the UE can be configured with one or more SRS-PowerControl, each of which configures a set of SRS power control parameters including p0, alpha and a SS/PBCH block index or CSI-RS resource index that indicates one downlink reference signal resource used to estimate pathloss for SRS power control. The configuration of SRS-PowerControl can be as follows:

TABLE 5

```
SRS-PowerControl ::=           SEQUENCE {
srs-PowerControl-Id                SRS-PowerControl-Id,
    alpha                          Alpha
    p0                             INTEGER (−202..24)
    referenceSignal                CHOICE {
       ssb-Index                   SSB-Index,
       csi-RS-Index
NZP-CSI-RS-ResourceId
    }
    srs-PowerControlAdjustmentStates       ENUMERATED {
sameAsFci2, separateClosedLoop}
}
SRS-PowerControl-Id ::=        INTEGER
(0..maxNrofSRS-PowerControls-1)
SRS-Config ::=                 SEQUENCE {
    srs-ResourceSetToReleaseList           SEQUENCE
(SIZE(1..maxNrofSRS-ResourceSets)) OF SRS-ResourceSetId
OPTIONAL,  -- Need N
    srs-ResourceSetToAddModList            SEQUENCE
(SIZE(1..maxNrofSRS-ResourceSets)) OF SRS-ResourceSet
OPTIONAL,  -- Need N
    srs-ResourceToReleaseList              SEQUENCE
(SIZE(1..maxNrofSRS-Resources)) OF SRS-ResourceId
OPTIONAL,  -- Need N
    srs-ResourceToAddModList               SEQUENCE
(SIZE(1..maxNrofSRS-Resources)) OF SRS-Resource
OPTIONAL,  -- Need N
    tpc-Accumulation                       ENUMERATED
{disabled}
OPTIONAL,  -- Need S
powerControlToAddModList           SEQUENCE (SIZE
(1..maxNrofSRS-PowerControls)) OF SRS-PowerControl
OPTIONAL, -- Need N
       powerControlToReleaseList   SEQUENCE (SIZE
(1..maxNrofSRS-PowerControls)) OF SRS-PowerControl-Id
OPTIONAL,  -- Need N
    ...
}
```

And then in the configuration of each SRS resource set, an SRS-PowerControl-Id is configured to indicate the power control parameters including a SS/PBCH block index or CSI-RS resource index that provides the downlink reference signal resource used to estimate pathloss for power control on transmission of any SRS resource configured in the set:

TABLE 6

```
SRS-ResourceSet ::=        SEQUENCE {
    srs-ResourceSetId          SRS-ResourceSetId,
    ...
    powerControl      SRS-PowerControl-Id
    OPTIONAL, -- Need M
    ...
}
```

The above methods for periodic, semi-persistent and aperiodic SRS are also applicable to this example by replacing SRS-pathlossReferenceId with SRS-PowerControl-Id. For one periodic, semi-persistent or aperiodic SRS resource set, a MAC CE is used to indicate one SRS-PowerControl-Id to update the power control parameter.

Second Example

The UE receives the configuration of a SRS resource set and in the configuration of the SRS resource set, the UE is provided with one reference signal ID:

TABLE 7

```
SRS-ResourceSet ::=       SEQUENCE {
    srs-ResourceSetId                SRS-ResourceSetId,
    ...
    usage                            ENUMERATED
{beamManagement, codebook, nonCodebook, antennaSwitching},
    alpha                            Alpha
OPTIONAL, -- Need S
    p0                               INTEGER (−202..24)
OPTIONAL, -- Cond Setup
    pathlossReferenceRS              CHOICE {
       ssb-Index                     SSB-Index,
       csi-RS-Index
NZP-CSI-RS-ResourceId
    }
OPTIONAL, -- Need M
    srs-PowerControlAdjustmentStates        ENUMERATED {
sameAsFci2, separateClosedLoop} Need   OPTIONAL, --
S
    ...
}
```

For a periodic SRS resource, the pathloss RS is determined as follows: For a UE configured with one or more SRS resource configurations and when the higher layer parameter resource Type in SRS-Resource is set to 'periodic':

1) The UE shall determine a SS/PBCH block index or CSI-RS resource index indicated by the higher layer parameter pathlossReferenceRS configured in the configuration of SRS resource set where the SRS resource belongs to.

2) The UE may receive a MAC CE command that contains spatial relation assumptions provided by a list of reference signal IDs for each SRS resource is a SRS resource set. The MAC CE command also contains one SRS-pathlossReferenceId for the SRS resource set in which the SRS resources are provided spatial relation assumptions. and the indicated SRS-pathlossReferenceId indicates one SRS-PathlossReferenceRS configured for SRS transmission in the given BWP of a serving cell.

3) If the indicated SRS resource set is configured with higher layer parameter pathlossReferenceRS, the UE shall assume that the ID of the downlink reference signal resource indicated by the SRS-pathlossReferenceId in the MAC CE command overrides the one configured in pathlossReferenceRS.

For a semi-persistent SRS resource, the pathloss RS is determined as follows: For a UE configured with one or more SRS resource configurations and when the higher layer parameter resource Type in SRS-Resource is set to 'semi-persistent':

1) when a UE receives an activation command for an SRS resource, and when the HARQ-ACK corresponding to the PDSCH carrying the activation command is transmitted in slot n, the corresponding actions and the UE assumptions on SRS transmission corresponding to the configured SRS resource set shall be applied starting from the first slot that is after slot $n+3N_{slot}^{subframe,\mu}$. The activation command also contains one downlink reference signal resource ID (a SS/PBCH block index or CSI-RS rescore index) for the activated SRS resource set to indicate one downlink reference signal resource used for pathloss estimation for SRS transmission.

2) If the activated SRS resource set is configured with higher layer parameter pathlossReferenceRS, the UE shall assume that the downlink reference signal resource index in the activation command overrides the one configured in pathlossReferenceRS.

3) If the activation command does not contain one downlink reference signal resource ID as pathloss RS for the activated SRS resource set, the UE shall assume the higher layer parameter pathlossReferenceRS provides a SS/PBCH block index or CSI-RS resource index for pathloss estimation.

4) If the UE is not provided with the higher layer parameter pathlossReferenceRS and if the UE does not receives an activation command containing one downlink reference signal resource ID as pathloss RS for the activated SRS resource set, the UE shall assume the SS/PBCH block that is used to obtain MIB (master system information) is the pathloss RS for the SRS resource set.

5) In one example, if the UE is not provided with the higher layer parameter pathlossReferenceRS and if the UE does not receive a MAC CE command containing one downlink reference signal resource ID as pathloss RS for the activated SRS resource set:

A) If the downlink reference signal configured in TCI-state configured to PDSCH where the semi-persistent SRS activation command is carried is a SS/PBCH block or a periodic CSI-RS resource or a semi-persistent CSI-RS resource that is activated, the UE shall use that SS/PBCH block or that CSI-RS resource to estimate the pathloss used for determining transmit power for the SRS transmission of SRS resource in the triggered SRS resource set. And if the downlink reference signal configured in TCI-state configured to PDSCH where the semi-persistent SRS activation command is carried is a aperiodic CSI-RS resource or non-activated semi-persistent CSI-RS resource, the UE shall use that SS/PBCH block that is used to obtain MIB to estimate the pathloss used for determining transmit power for the SRS transmission of SRS resource in the triggered SRS resource set.

B) If the downlink reference signal configured in TCI-state configured to CORESET where the DCI scheduling the PDSCH transmission carrying the semi-persistent SRS activation command is detected is a SS/PBCH block or a periodic CSI-RS resource or a semi-persistent CSI-RS resource that is activated, the UE shall use that SS/PBCH block or that CSI-RS resource to estimate the pathloss used for determining transmit power for the SRS transmission of SRS resource in the triggered SRS resource set. And if the downlink reference signal configured in TCI-state configured to CORESET where the DCI scheduling the PDSCH transmission carrying the semi-persistent SRS activation command is detected is a aperiodic CSI-RS resource or non-activated semi-persistent CSI-RS resource, the UE shall use that SS/PBCH block that is used to obtain MIB to estimate the pathloss used for determining transmit power for the SRS transmission of SRS resource in the triggered SRS resource set.

For an aperiodic SRS resource, the pathloss RS is determined as follows: For a UE configured with one or more SRS resource configurations and when the higher layer parameter resource Type in SRS-Resource is set to 'aperiodic':

1) The UE may receive a MAC CE command that contains spatial relation assumptions provided by a list of reference signal IDs for each SRS resource is a SRS resource set. The MAC CE command also contains one SRS-pathlossReferenceId for the SRS resource set in which the SRS resources are provided spatial relation assumptions. and the indicated SRS-pathlossReferenceId indicates one SRS-PathlossReferenceRS configured for SRS transmission in the given BWP of a serving cell.

2) If the indicated SRS resource set is configured with higher layer parameter pathlossReferenceRS, the UE shall assume that the ID of the downlink reference signal resource indicated by the SRS-pathlossReferenceId in the activation command overrides the one configured in pathlossReferenceRS.

3) The UE receives a downlink DCI, a group common DCI, or an uplink DCI based command where a codepoint of the DCI may trigger one or more SRS resource set(s). If the UE does not receive activation command containing SRS-pathlossReferenceId for an SRS resource set, the UE assume the higher layer parameter pathlossReferenceRS provides a SS/PBCH block index or CSI-RS resource index for pathloss estimation for SRS transmission in the SRS resource set.

4) If the UE is not provided with the higher layer parameter pathlossReferenceRS and if the UE does not receives an MAC CE command containing one downlink reference signal resource ID as pathloss RS for one SRS resource set, the UE shall assume the SS/PBCH block that is used to obtain MIB (master system information) is the pathloss RS for the SRS resource set.

5) In one example, if the UE is not provided with the higher layer parameter pathlossReferenceRS and if the UE does not receive a MAC CE command containing one downlink reference signal resource ID as pathloss RS for one SRS resource set:

A) If the downlink reference signal configured in TCI-state configured to CORESET where the DCI triggering SRS transmission is detected is a SS/PBCH block or a periodic CSI-RS resource or a semi-persistent CSI-RS resource that is activated, the UE shall use that SS/PBCH block or that CSI-RS resource to estimate the pathloss used for determining transmit power for the SRS transmission of SRS resource in the triggered SRS resource set. If the downlink reference signal configured in TCI-state configured to CORESET where the DCI triggering SRS transmission is detected is a aperiodic CSI-RS resource or non-activated semi-persistent CSI-RS resource, the UE shall use that SS/PBCH block that is used to obtain MIB to estimate the pathloss used for determining transmit power for the SRS transmission of SRS resource in the triggered SRS resource set.

Third Example

In the configuration of a SRS set, the UE can be configured with a list of SRS pathloss reference signals:

TABLE 8

```
SRS-ResourceSet ::=                    SEQUENCE {
    srs-ResourceSetId                  SRS-ResourceSetId,
    ...
    usage                              ENUMERATED
{beamManagement, codebook, nonCodebook, antennaSwitching},
    alpha                              Alpha
OPTIONAL, -- Need S
    p0                                 INTEGER (−202..24)
OPTIONAL, -- Cond Setup
    pathlossReferenceRSToAddModList    SEQUENCE (SIZE
(1..maxNrofSRS-PathlossReferenceRSs)) OF
SRS-PathlossReferenceRS
OPTIONAL, -- Need N
    pathlossReferenceRSToReleaseList   SEQUENCE (SIZE
(1..maxNrofSRS-PathlossReferenceRSs)) OF
SRS-PathlossReferenceRS-Id
```

TABLE 8-continued

```
OPTIONAL, -- Need N
    srs-PowerControlAdjustmentStates    ENUMERATED {
sameAsFci2, separateClosedLoop}         OPTIONAL, -- Need
S
    ...
}
SRS-PathlossReferenceRS ::=             SEQUENCE {
    srs-PathlossReferenceRS-Id
SRS-PathlossReferenceRS-Id,
    referenceSignal                     CHOICE {
        ssb-Index                           SSB-Index,
        csi-RS-Index
NZP-CSI-RS-ResourceId
    }
}
SRS-PathlossReferenceRS-Id ::=          INTEGER
(0..maxNrofSRS-PathlossReferenceRSs-1)
```

The procedure to determine pathloss RS for periodic, semi-persistent and aperiodic SRS transmissions are similar to the procedure described in the first or second example.

Figure 3:
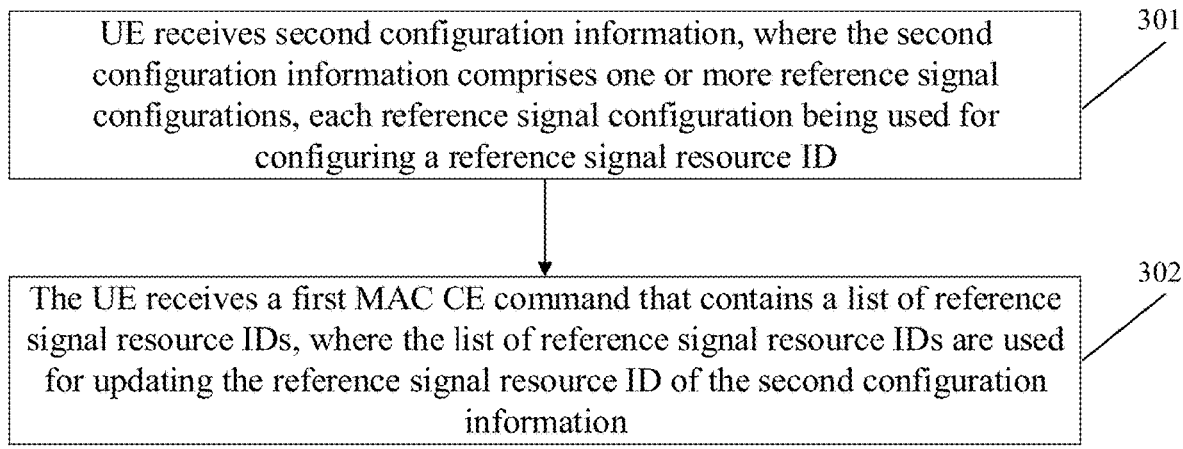
FIG. 3 is a second schematic flowchart of a reference signal determination method according to an embodiment of the disclosure.

FIG. 3 is a second schematic flowchart of a reference signal determination method according to an embodiment of the disclosure. As shown in FIG. 3, the reference signal determination method includes operations 301 to 302.

In operation 301, UE receives second configuration information, where the second configuration information comprises one or more reference signal configurations, each reference signal configuration being used for configuring a reference signal resource identifier (ID).

The technical solution according to the embodiment of the disclosure is intended to determine a pathloss reference signal for PUSCH transmission. Herein, the pathloss reference signal is a reference signal used for estimating the pathloss.

In an embodiment of the disclosure, the second configuration information includes one or more reference signal configurations. In a possible implementation, the reference signal configuration is PUSCH-PathlossReferenceRS. Further, PUSCH-PathlossReferenceRS is used for configuring an index of a reference signal resource. Herein, the index of the reference signal resource is for example an SS/PBCH block index or a CSI-RS resource index. It should be noted that PUSCH-PathlossReferenceRS can be identified by identification information such as pusch-PathlossReferenceRS-Id.

In a possible implementation, the reference signal configuration is included in PUSCH power configuration. That is to say, the UE receives second configuration information including one or more PUSCH power configurations each of which is used for configuring a PUSCH power parameter. Herein, the PUSCH power parameter includes at least a reference signal resource ID. In a possible implementation, the PUSCH power configuration is SRI-PUSCH-PowerControl. It should be noted that SRI-PUSCH-PowerControl can be identified by identification information, such as sri-PUSCH-PowerControlId. Each sri-PUSCH-PowerControlId corresponds to a codepoint in the SRI field. Herein, the SRI field is carried in DCI scheduling PUSCH transmission.

In operation 302, the UE receives a first MAC CE command that contains a list of reference signal resource IDs, where the list of reference signal resource IDs are used for updating the reference signal resource ID of the second configuration information.

In a possible implementation, in a case where the UE is not provided with the one or more reference signal configurations, the UE determines mapping between multiple reference signal resource IDs of the list of reference signal resource IDs and multiple codepoints in an SRS Resource Indicator (SRI) field, where the SRI field is carried in first DCI for scheduling PUSCH transmission In a possible implementation, in a case where the UE is not provided with the one or more reference signal configurations and the UE does not receive the first MAC CE command, 1) in response to that a first Sounding Reference Signal (SRS) resource is indicated by the SRI field in the first DCI and spatial relation information of the first SRS resource is determined based on a first reference signal resource, the UE estimates a pathloss of the PUSCH transmission based on the first reference signal resource; or 2) the UE estimates the pathloss of the PUSCH transmission based on a second reference signal resource, where the second reference signal resource is a reference signal resource used for estimating pathloss for an SRS resource set, the SRS resource set being configured for the PUSCH transmission; or 3) the UE estimates the pathless of the PUSCH transmission based on a third reference signal resource, wherein the third reference signal resource is configured through a second Transmission Configuration Indicator-state (TCI-state).

In the above technical solution, the SRI field only indicates the first SRS resource.

Alternatively, the SRI field indicates multiple SRS resources, where the first SRS resource is one of the multiple SRS resources. For example, the first SRS resource is an SRS resource with a smallest SRS index among the multiple SRS resources In the above technical solution, the second TCI-state is used for determining a downlink beam of a Control Resource Set (CORESET), wherein the CORESET is used for transmitting scheduling information of the PUSCH.

The technical solutions according to embodiments of the disclosure will be further elaborated in combination with specific application examples.

Fourth Example

For PUSCH transmission in a given BWP in a serving cell, the UE can be configured with one or more higher layer parameters PUSCH-PathlossReferenceRS, each of which configures one downlink reference signal resource ID that can be a SS/PBCH resource index or CSI-RS resource index and each of which is identified by a ID pusch-PathlossReferenceRS-Id.

1) The UE may receive a MAC CE command that contains a list of downlink reference signal resource IDs (SS/PBCH block index or CSI-RS resource index), one per PUSCH-PathlossReferenceRS configured in higher layer for PUSCH transmission in a given BWP in a serving cell.

A) The MAC CE command can contain a list of up to N SS/PBCH block indices or CSI-RS resource indices to provide PUSCH pathloss reference signals for PUSCH in a given BWP in a serving cell. The value of N can be maxNrofPUSCH-PathlossReferenceRSs.

2) Each ID of downlink reference signal resource contained in the MAC CE command overrides the downlink reference signal index configured in the corresponding PUSCH-PathlossReferenceRS.

3) If the UE is not provided with PUSCH-PathlossReferenceRS for PUSCH transmission in a given BWP in a serving cell, the UE ignore the MAC CE command that contains a list of downlink reference signal resource IDs that indicate pathloss reference signals for PUSCH transmission in that BWP.

4) If the UE is not provided with PUSCH-PathlossReferenceRS for PUSCH transmission in a given BWP in a serving cell and if the UE receives a MAC CE command that contains a list of downlink reference signal resource IDs that indicate pathloss reference signals for PUSCH transmission in that BWP, the UE assume the indicated downlink reference signal resource IDs are mapped with codepoint of SRI field in DCI format in order. In other word, the n-th entry of downlink reference signal resource ID in the MAC CE command is mapped with codepoint value n−1 of the SRI field in DCI format.

5) If the UE is not provided with PUSCH-PathlossReferenceRS for PUSCH transmission in a given BWP in a serving cell and if the UE does not receive a MAC CE command that contains a list of downlink reference signal resource IDs that indicate pathloss reference signals for PUSCH transmission in that BWP:

A) for a Codebook-Based PUSCH Transmission:

Alternative 1: a SRS resource is indicated by the SRI field in the DCI scheduling the PUSCH transmission and if the spatial relation info assumption of that SRS resource is a SS/PBCH block or a periodic CSI-RS resource or a semi-persistent CSI-RS resource that is activated, the UE shall use the downlink reference signal index configured in the spatial relation info assumption of the SRS resource indicated by the SRI as pathloss RS to estimate pathloss for determining transmit power of the PUSCH transmission.

Alternative 2: the UE shall use the downlink reference signal configured as pathloss RS for the SRS resource set configured for codebook-based PUSCH transmission to estimate the pathloss for determining transmit power for the PUSCH transmission.

Alternative 3: If the downlink reference signal configured in TCI-state configured to CORESET where the DCI scheduling the PUSCH transmission is detected is a SS/PBCH block or a periodic CSI-RS resource or a semi-persistent CSI-RS resource that is activated, the UE shall use that SS/PBCH block or that CSI-RS resource to estimate the pathloss used for determining transmit power for the PUSCH transmission.

B) For Non-Codebook-Based PUSCH Transmission:

Alternative 1: If only one SRS resource is indicated by the SRI field in the DCI scheduling the non-codebook based PUSCH transmission and if the spatial relation info assumption of that SRS resource is a SS/PBCH block or periodic CSI-RS resource or a semi-persistent CSI-RS resource that is activated, the UE shall use the downlink reference signal index configured in the spatial relation info assumption of the SRS resource indicated by the SRI as pathloss RS to estimate pathloss for determining transmit power of the PUSCH transmission. If more than one SRS resources is indicated by the SRI field in the DCI scheduling the non-codebook based PUSCH transmission and if the spatial relation info assumption of one or more of those indicated SRS resources is a SS/PBCH block or periodic CSI-RS resource or semi-persistent CSI-RS resource that is activated, the UE shall use the downlink reference signal index configured in the spatial relation info assumption of a first SRS resource indicated by the SRI as pathloss RS to estimate pathloss for determining transmit power of the PUSCH transmission.

In one example, the first SRS resource can be the SRS resource with lowest SRS resource ID among all the SRS resource indicated by the SRI, in which the spatial relation info assumption of one or more of those indicated SRS resources is a SS/PBCH block or periodic CSI-RS resource or semi-persistent CSI-RS resource that is activated.

Alternative 2: If the downlink reference signal configured in TCI-state configured to CORESET where the DCI scheduling the PUSCH transmission is detected is a SS/PBCH block or a periodic CSI-RS resource or a semi-persistent CSI-RS resource that is activated, the UE shall use that SS/PBCH block or that CSI-RS resource to estimate the pathloss used for determining transmit power for the PUSCH transmission.

Alternative 3: the UE shall use the downlink reference signal configured as pathloss RS for the SRS resource set configured for non-codebook-based PUSCH transmission to estimate the pathloss for determining transmit power for the PUSCH transmission.

C) For a PUSCH transmission configured by ConfiguredGrantConfig that does not include rrc-ConfiguredUplinkGrant, the UE can determine the pathloss RS according the methods described above.

D) For a PUSCH transmission configured by ConfiguredGrantConfig that includes rrc-ConfiguredUplinkGrant, if higher layer parameter pathlossReferenceIndex is not provided in rrc-ConfiguredUplinkGrant, the UE shall use the SS/PBCH block that is used to obtain MIB to estimate pathloss for determining transmit power for the PUSCH transmission.

Fifth Example

UE can be configured with a list of PUSCH power configurations and the UE is configured with the mapping between PUSCH power configuration and codepoint of SRI field in DCI format scheduling PUSCH transmission. The UE can receive a MAC CE command to update the mapping between PUSCH power control configuration and codepoints of SRI field in the DCI format.

1) Alternative 1: In one example, the UE is configured with a list of PUSCH power control configuration SRI-PUSCH-PowerControl in RRC signaling as follows:

TABLE 9

```
SRI-PUSCH-PowerControl ::=    SEQUENCE {
    sri-PUSCH-PowerControlId
    SRI-PUSCH-PowerControlId,
    sri-PUSCH-PathlossReferenceRS-Id
    PUSCH-PathlossReferenceRS-Id,
    sri-P0-PUSCH-AlphaSetId       P0-PUSCH-AlphaSetId,
    sri-PUSCH-ClosedLoopIndex     ENUMERATED { i0, i1 }
}
``` where sri-PUSCH-PowerControlId is used as codepoint in the SRI DCI field in the DCI format that schedules PUSCH transmission. The UE can receive a MAC CE command that updates the value of sri-PUSCH-PowerControlId for one or more SRI-PUSCH-PowerControl configured for PUSCH transmission in a given BWP in a serving cell. An example of the MAC CE message design is shown as follows in FIG. 4:

where each field ci with i=0, 1, 2, 3 . . . , carries value of codepoint of SRI DCI field. The SRI-PUSCH-PowerControl configuration identified by the value of sri-PUSCH-PowerControlId=i is mapped with the codepoint of SRI DCI field=the value carried in field $c_i$.

2) Alternative 2: In another example, the UE is configured with K≥1 SRI-PUSCH-PowerControl configurations in RRC and the UE can receive one MAC CE command that activates N≥1 SRI-PUSCH-PowerControl configurations and also indicates the mapping between those N≥1 SRI-PUSCH-PowerControl configurations and the codepoint of SRI DCI field in the DCI format. An example of the MAC CE message design is shown in FIG. 4:

Each field ci with i=0, 1, 2, 3 . . . , carries one value of sri-PUSCH-PowerControlId. The SRI-PUSCH-PowerControl configuration identified by the value of sri-PUSCH-PowerControlId carried in field ci is mapped to codepoint=i of the SRI DCI field.

3) The above information delivered in MAC CE command can also be included in the MAC CE command that activates transmission of semi-persistent SRS and can also be included in the MAC-CE command that updates spatial relation info for aperiodic SRS resource.

Sixth Example

For a PUSCH transmission scheduled by a DCI format that indicate one or more SRS resource through SRI field in the DCI format, the UE shall assume to use the pathloss RS configured for the SRS resource that is indicated by the SRI field in the DCI format as the pathloss RS for estimate pathloss for determining transmit power of the PUSCH transmission:

1) For a Codebook-Based PUSCH Transmission:

A) Alternative 1: the UE shall use the SS/PBCH block or CSI-RS resource that is configured as pathloss RS to the SRS resource set that is configured for codebook-based transmission, i.e., the higher layer parameter usage of the SRS set is set to be codebook, to estimate the pathloss that is used in determining the transmit power of the PUSCH transmission.

B) Alternative 2: the DCI scheduling the codebook-based PUSCH transmission indicates one SRS resource through the SRI field and the UE shall use the SS/PBCH block index or CSI-RS resource that is used to estimate pathloss for power control of the SRS resource to estimate the pathloss used in calculating the transmit power of the PUSCH transmission.

2) For a Non-Codebook-Based PUSCH Transmission:

A) Alternative 1: the UE shall use the SS/PBCH block index or CSI-RS resource that is configured as pathloss RS to the SRS resource set that is configured for non-codebook-based transmission, i.e., the higher layer parameter usage of the SRS set is set to be nonCodebook, to estimate the pathloss that is used in determining the transmit power of the PUSCH transmission.

B) Alternative 2: the DCI scheduling the codebook-based PUSCH transmission indicates one or more SRS resource through the SRI field and the UE shall use the SS/PBCH block index or CSI-RS resource that is used to estimate pathloss for power control of the SRS resource with lowest (another example is largest) SRS resource ID among those indicated SRS to estimate the pathloss used in calculating the transmit power of the PUSCH transmission.

3) For a PUSCH Transmission Configured by ConfiguredGrantConfig that does not Include Rrc-ConfiguredUplinkGrant:

A) Alternative 1: the UE shall use the SS/PBCH block index or CSI-RS resource that is configured as pathloss RS to the SRS resource set that is configured for codebook or non-codebook-based transmission, i.e., the higher layer parameter usage of the SRS set is set to be noncodebook or codebook, to estimate the pathloss that is used in determining the transmit power of the PUSCH transmission.

B) Alternative 2: the DCI scheduling the codebook-based PUSCH transmission indicates one or more SRS resource through the SRI field and the UE shall use the SS/PBCH block index or CSI-RS resource that is used to estimate pathloss for power control of the SRS resource with lowest (another example is largest) SRS resource ID among those indicated SRS to estimate the pathloss used in calculating the transmit power of the PUSCH transmission.

Seventh Example

The UE is configured with a list of SRS-SpatialRelationInfo configurations for the SRS configuration in a given BWP in a serving cell. Each SRS resource configured in that BWP can be configured with one of those SRS-SpatialRelationInfo configurations. In each SRS-SpatialRelationInfo configuration, the UE can be configured with the following parameters:

A downlink SS/PCBH block index, or a CSI-RS resource index or a SRS resource index to provide spatial relation info for the SRS resource transmission.

A downlink SS/PBCH block index, or a CSI-RS resource index to provide pathloss reference RS for the SRS resource transmission.

An example of SRS-SpatialRelationInfo is given as:

TABLE 10

| | |
|---|---|
| SRS-SpatialRelationInfo ::= | SEQUENCE { |
| srs-SpatialRelationInfoId | |
| SRS-SpatialRelationInfoId, | |
| servingCellId | ServCellIndex |
| OPTIONAL, -- Need S | |
| referenceSignal | CHOICE { |
| ssb-Index | SSB-Index, |
| csi-RS-Index | |
| NZP-CSI-RS-ResourceId, | |
| srs | SEQUENCE { |
| | resource |
| SRS-ResourceId, | |
| | uplinkBWP |
| BWP-Id | |
| | } |
| }, | |
| srs-PathlossReferenceRS-Id | |
| SRS-PathlossReferenceRS-Id, | |
| . . . | |
| } | |
| SRS-PathlossReferenceRS ::= | SEQUENCE { |
| srs-PathlossReferenceRS-Id | |
| SRS-PathlossReferenceRS-Id, | |
| referencesignal | CHOICE { |
| ssb-Index | SSB-Index, |
| csi-RS-Index | |
| NZP-CSI-RS-ResourceId | |
| } | |
| } | |

The UE can be configured with a SRS resource set and one or more SRS resources are configured in the set. The UE expects that the SRS-SpatialRelationInfo configured to the SRS resources in the same SRS resource set shall have the same srs-PathlossReferenceRS-Id. The SRS resource set can be configured with a srs-PathlossReferenceRS-Id to provide the pathloss RS for all the SRS resource in the set:

1) The UE is configured with an SRS resource set with N≥1 SRS resources and if none of the SRS resources are configured or indicated with a SRS-SpatialRelationInfo A) if the SRS resource set is configured with srs-PathlossReferenceRS-Id, the UE shall assume the downlink RS provided by the srs-PathlossReferenceRS-Id is the pathloss RS for power control of SRS resource in the set.

B) if the SRS resource set is not configured with srs-PathlossReferenceRS-Id, the UE shall assume the SS/PBCH that is used to obtained the MIB is the pathloss RS for power control of SRS resource in the set.

2) The UE is configured with a SRS resource set with N≥1 SRS resources and if some or all of the SRS resources are configured or indicated with a SRS-SpatialRelationInfo, the UE shall use the pathloss RS configured in any of those SRS-SpatialRelationInfo to estimate the pathloss for determining transmit power of any SRS in the set.

3) For periodic SRS resource, the UE can be configured with one SRS-SpatialRelationInfo for one SRS resource in the given BWP in a serving cell.

4) For semi-persistent SRS resource, the UE receives an activation command to activate the transmission of one SRS resource. The activation command also contains a indicator of SRS-SpatialRelationInfo for the activated SRS resource, which provides spatial relation info assumption for the SRS resource and pathloss RS for the SRS resource set.

5) For aperiodic SRS resource, the UE receives an MAC CE command to indicate one SRS-SpatialRelationInfo for one SRS resource.

6) For a codebook-based PUSCH transmission scheduled by DCI format 0_1, the UE shall use the pathloss RS configured in the SRS-SpatialRelationInfo configured to the SRS resource indicated by the codepoint of SRI in the scheduling DCI format 0_1 to estimate pathloss for determining transmit power for the PUSCH transmission.

7) For non-codebook-based PUSCH transmission scheduled by DCI format 0_1, the UE shall use the pathloss RS configured in the SRS-SpatialRelationInfo configured to any one of the SRS resource(s) indicated by the codepoint of SRI in the scheduling DCI format 0_1 to estimate pathloss for determining transmit power for the PUSCH transmission.

Eighth Example

The UE receives MAC CE command to indicate one TCI-state for a CSI-RS:

1) For a semi-persistent CSI-RS resource, the UE receives an activation command to activate the transmission of CSI-RS resource in a set. The activation command also contains a TCI-state for each activated CSI-RS resource.

2) For periodic CSI-RS resource, the UE can receive a MAC CE command to indicate one TCI-state for a CSI-RS resource. In one example, the MAC CE command can indicate TCI-states for CSI-RS resources in a set and indicate one TCI-state for each CSI-RS resource in the set. When the HARQ-ACK corresponding to the PDSCH carrying the MAC CE command is transmitted in slot n, the UE assumptions of QCL on CSI-RS transmission corresponding to the configured CSI-RS resource set shall be applied starting from the first slot that is after slot $n+3N_{slot}^{subframe,\mu}$.

3) For aperiodic CSI-RS resource, the UE can receive a MAC CE command to indicate one TCI-state for a CSI-RS resource. In one example, the MAC CE command can indicate TCI-states for CSI-RS resources in a set and indicate one TCI-state for each CSI-RS resource in the set.

A) When the HARQ-ACK corresponding to the PDSCH carrying the MAC CE command is transmitted in slot n, the UE assumptions of QCL on CSI-RS transmission corresponding to the configured CSI-RS resource set shall be applied starting from the first slot that is after slot $n+3N_{slot}^{subframe,\mu}$.

B) When the HARQ-ACK corresponding to the PDSCH carrying the MAC CE command is transmitted in slot n, the UE shall assume the indicated TCI-state is applied to aperiodic CSI-RS transmission that happens after slot $n+3N_{slot}^{subframe,\mu}$.

C) When the HARQ-ACK corresponding to the PDSCH carrying the MAC CE command is transmitted in slot n, the UE shall assume the indicated TCI-state is applied to aperiodic CSI-RS transmission that is triggered by a DCI received in a slot after slot $n+3N_{slot}^{subframe,\mu}$.

In the technical solutions according to embodiments of the disclosure, in one aspect, the UE is configured with a list of SRS-PathlossReferenceRS. Activation command for semi-persistent SRS also contains SRS-PathlossReferenceRS for each activated SRS resource. A MAC CE command indicates an SRS-PathlossReferenceRS and reference signal ID for spatial relation info for periodic or aperiodic one SRS resource. In another aspect, for PUSCH transmission, the UE is configured with a list of SRI-PUSCH-PowerControl configurations. And a MAC CE command is used to updates/indicates the mapping between codepoint of SRI DCI field and SRI-PUSCH-PowerControl configurations. In yet another aspect, for PUSCH transmission, the UE is configured with a list of PUSCH-PathlossReferenceRS, each of which configures one downlink reference signal resource ID that can be a SS/PBCH resource index or CSI-RS resource index and each of which is identified by an ID pusch-PathlossReferenceRS-Id. The UE may receive a MAC CE command that contains a list of downlink reference signal resource IDs (SS/PBCH block index or CSI-RS resource index), one per pusch-PathlossReferenceRS-Id to update the pathloss RS configured in PUSCH-PathlossReferenceRS identified by a pusch-PathlossReferenceRS-Id.

Figure 5:
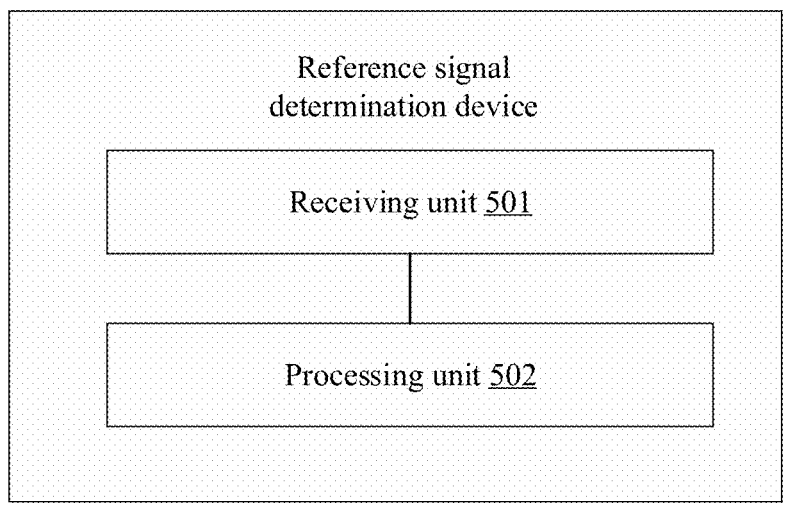
FIG. 5 is a first schematic structural diagram of a reference signal determination device according to an embodiment of the disclosure.

FIG. 5 is a first schematic structural diagram of a reference signal determination device according to an embodiment of the disclosure. As shown in FIG. 5, the device includes a receiving unit 50 1.

The receiving unit 501 is configured to receive first configuration information, where the first configuration information is used for determining configuration information of a Sounding Reference Signal (SRS) resource set, the configuration information of the SRS resource set includes first indication information for indicating an index of a first reference signal source, and the first reference signal resource is used for estimating a pathloss of a first SRS resource of the SRS resource set.

In a possible implementation, when the first SRS resource is a periodic SRS resource, the device may further include:

a processing unit 502, configured to estimate the pathloss of the first SRS resource based on the index of the first reference signal source, which is indicated by the first indication information.

In a possible implementation, the receiving unit 501 is further configured to receive a first Media Access Control Control Element (MAC CE) command that contains spatial relation assumptions, the spatial relation assumptions being used for determining spatial relation information of SRS resources in the SRS resource set, wherein the spatial relation assumptions are provided by a list of reference signal Identifiers (IDs).

In a possible implementation, when the first SRS resource is a semi-persistent SRS resource, the receiving unit 501 may be further configured to receive a first activation command for activating the first SRS resource, the device may further include a processing unit 502 configured to: in response to that the first activation command contains second indication information for indicating an index of a second reference signal resource, estimate the pathloss of the first SRS resource based on the index of the second reference signal source, which is indicated by the second indication information; or in response to that the first activation command does not contain the second indication information for indicating the index of the second reference signal resource, estimate the pathloss of the first SRS resource based on the index of the first reference signal source, which is indicated by the first indication information.

In a possible implementation, in a case where the receiving unit 501 does not receive the first activation command, and in response to that the configuration information of the SRS resource set does not comprise the first indication information, the processing unit 502 is configured to: estimate the pathloss of the first SRS resource based on a third reference signal resource, the third reference signal resource being a reference signal resource used to obtain Master System Information (MIB); or estimate the pathloss of the first SRS resource based on a fourth reference signal resource, the fourth reference signal resource being configured through a first Transmission Configuration Indicator-state (TCI-state).

In a possible implementation, the first TCI-state is used for determining a downlink beam of a Physical Downlink Shared Channel (PDSCH), wherein the PDSCH is used for carrying the first activation command.

In a possible implementation, the first TCI-state is used for determining a downlink beam of a Control Resource Set (CORESET), wherein the CORESET is used for transmitting scheduling information of a PDSCH carrying the first activation command.

In a possible implementation, when the first SRS resource is an aperiodic SRS resource, the receiving unit 501 may be further configured to receive a second MAC CE command that contains spatial relation assumptions, the spatial relation assumptions being used for determining spatial relation information of SRS resources in the SRS resource set, wherein the spatial relation assumptions are provided by a list of reference signal IDs.

In a possible implementation, the device may further include:

a processing unit 502, configured to, in response to that the second MAC CE command contains third indication information for indicating an index of a third reference signal resource, estimate the pathloss of the first SRS resource based on the index of the third reference signal source, which is indicated by the third indication information.

In a possible implementation, the device may further include:

a processing unit 502, configured to, in response to that the second MAC CE command does not contain third indication information for indicating an index of a third reference signal resource, estimate the pathloss of the first SRS resource based on the index of the first reference signal source, which is indicated by the first indication information.

In a possible implementation, in a case where the receiving unit 501 does not receive the second MAC CE command, and in response to that the configuration information of the SRS resource set does not comprise the first indication information, the device may further include:

a processing unit 502 configured to: estimate the pathloss of the first SRS resource based on a third reference signal resource, the third reference signal resource being a reference signal resource used to obtain MIB; or estimate the pathloss of the first SRS resource based on a fourth reference signal resource, the fourth reference signal resource being configured through a first TCI-state.

In a possible implementation, the first TCI-state is used for determining a downlink beam of a CORESET, wherein the CORESET is used for transmitting first Downlink control information (DCI) for triggering transmission of the first SRS resource.

It should be appreciated by those skilled in the art that the description of the reference signal determination device according to embodiments of the disclosure can be understood based on related description of the reference signal determination method according to embodiments of the disclosure.

Figure 6:
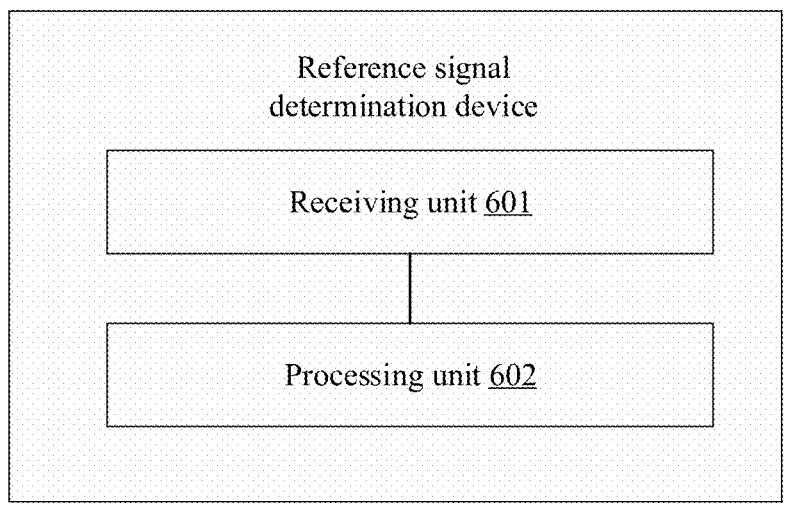
FIG. 6 is a second schematic structural diagram of a reference signal determination device according to an embodiment of the disclosure.

FIG. 6 is a second schematic structural diagram of a reference signal determination device according to an embodiment of the disclosure. As shown in FIG. 6, the device includes a receiving unit 601.

The receiving unit 610 is configured to: receive second configuration information, where the second configuration information comprises one or more reference signal configurations, each reference signal configuration being used for configuring a reference signal resource identifier (ID); and receive a first Media Access Control Control Element (MAC CE) command that contains a list of reference signal resource IDs, wherein the list of reference signal resource IDs are used for updating the reference signal resource ID of the second configuration information.

In a possible implementation, the device may further include:

a processing unit 602 configured to, in a case where the UE is not provided with the one or more reference signal configurations, determine mapping between multiple reference signal resource IDs of the list of reference signal resource IDs and multiple codepoints in an SRS Resource Indicator (SRI) field, wherein the SRI field is carried in first Downlink Control Information (DCI) for scheduling Physical Uplink Shared Channel (PUSCH) transmission.

In a possible implementation, the device may further include:

a processing unit 602 configured to: in a case where the UE is not provided with the one or more reference signal configurations and the UE does not receive the first MAC CE command, in response to that a first Sounding Reference Signal (SRS) resource is indicated by the SRI field in the first DCI and spatial relation information of the first SRS resource is determined based on a first reference signal resource, estimate a pathloss of the PUSCH transmission based on the first reference signal resource; or estimate the pathloss of the PUSCH transmission based on a second reference signal resource, wherein the second reference signal resource is a reference signal resource used for estimating pathloss for an SRS resource set, the SRS resource set being configured for the PUSCH transmission; or estimate the pathless of the PUSCH transmission based on a third reference signal resource, wherein the third reference signal resource is configured through a second Transmission Configuration Indicator-state (TCI-state).

In a possible implementation, the SRI field only indicates the first SRS resource; or the SRI field indicates multiple SRS resources, wherein the first SRS resource is one of the multiple SRS resources.

In a possible implementation, the second TCI-state is used for determining a downlink beam of a Control Resource Set (CORESET), wherein the CORESET is used for transmitting scheduling information of the PUSCH.

In a possible implementation, the one or more reference signal configurations are included in PUSCH power configurations.

It should be appreciated by those skilled in the art that the description of the reference signal determination device according to embodiments of the disclosure can be understood based on related description of the reference signal determination method according to embodiments of the disclosure.

Figure 7:
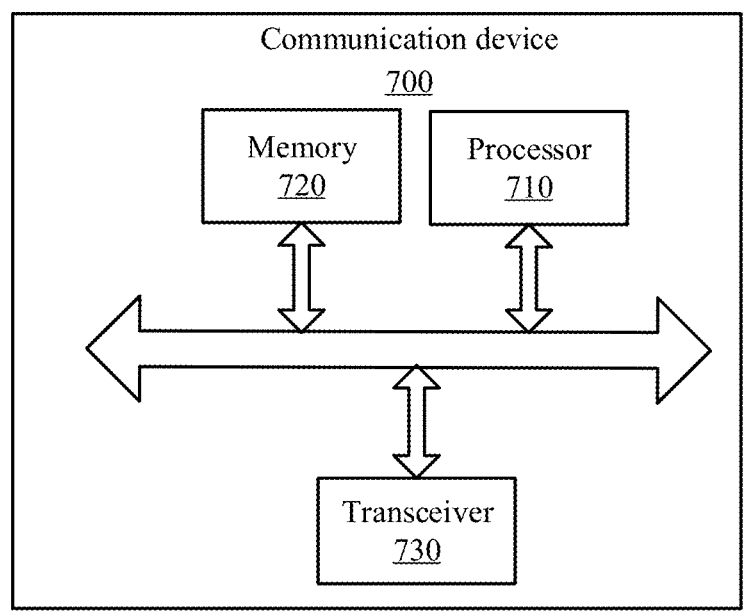
FIG. 7 is a schematic structural diagram of a communication device according to an embodiment of the present disclosure.

FIG. 7 is a schematic structural diagram of a communication device 700 provided in the embodiments of the present disclosure. The communication device can be UE or network device. The communication device 700 illustrated in FIG. 7 includes processor 710, and processor 710 can call and run computer programs from memory to realize the method in the embodiments of the present disclosure.

Optionally, as illustrated in FIG. 7, the communication device 700 may further include a memory 720. The processor 710 can invoke and run the computer program from memory 720 to implement the method in the embodiments of the disclosure.

The memory 720 may be a separate device independent of or integrated into the processor 710.

Optionally, as illustrated in FIG. 7, the communication device 700 may also include a transceiver 730. The processor 710 may control the transceiver 730 to communicate with other devices, in particular, to send information or data to other devices, or receive information or data sent by other devices.

The transceiver 730 may include a transmitter and a receiver. The transceiver 630 may further include an antenna(s), the number of which may be one or more.

Optionally, the communication device 700 can be specifically a network device of the embodiment of the present disclosure, and the communication device 600 can realize the corresponding process realized by the network device in each method of the embodiments of the present disclosure. For the sake of simplicity, it will not be elaborated here.

Optionally, the communication device 700 can be a mobile terminal/UE according to the embodiments of the present disclosure, and the communication device 600 can realize the corresponding flow realized by the mobile terminal/UE in the various methods of the embodiments of the present disclosure. For the sake of brevity, it will not be described here.

Figure 8:
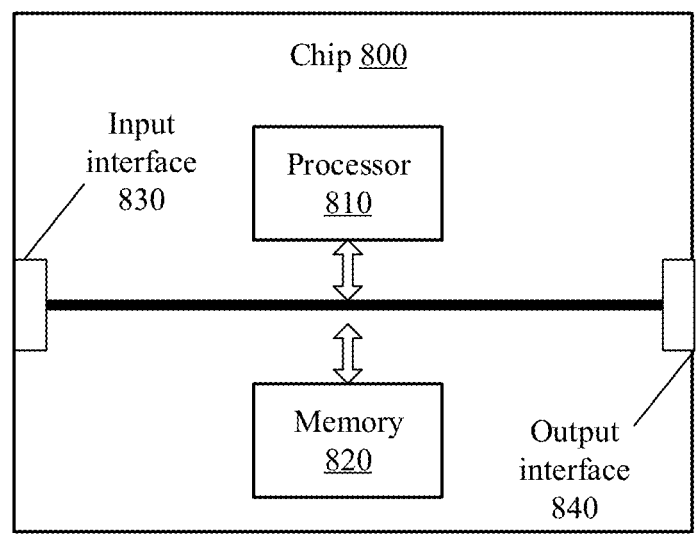
FIG. 8 is a schematic structural diagram of a chip according to an embodiment of the present disclosure.

FIG. 8 is a schematic structural diagram of a chip according to an embodiment of the present disclosure. The chip 800 illustrated in FIG. 8 includes processor 810, and processor 810 can invoke and run computer programs from memory to implement the method in the embodiments of the disclosure.

Optionally, as illustrated in FIG. 8, the chip 800 may also include a memory 820. The processor 810 can invoke and run the computer program from memory 820 to implement the method in the embodiments of the disclosure.

The memory 820 may be a separate device independent of or integrated into the processor 810.

Optionally, the chip 800 may also include an input interface 830. The processor 810 can control the input interface 830 to communicate with other devices or chips, and in particular can obtain information or data sent by other devices or chips.

Optionally, the chip 800 may also include an output interface 840. The processor 810 may control the output interface 840 to communicate with other devices or chips, and in particular may output information or data to other devices or chips.

Optionally, the chip can be applied to the network device in the embodiments of the present disclosure, and the chip can realize the corresponding process realized by the network device in each method of the embodiments of the disclosure. For the sake of brevity, it will not be elaborated here.

Optionally, the chip can be applied to the mobile terminal/UE in the embodiments of the present disclosure, and the chip can realize the corresponding flow realized by the mobile terminal/UE in each method of the embodiment of the disclosure. For the sake of simplicity, it will not be described here.

It is to be understood that the chips mentioned in the embodiments of the present disclosure can also be referred to as system level chips, system chips, chip systems or on-chip system chips, etc.

Figure 9:
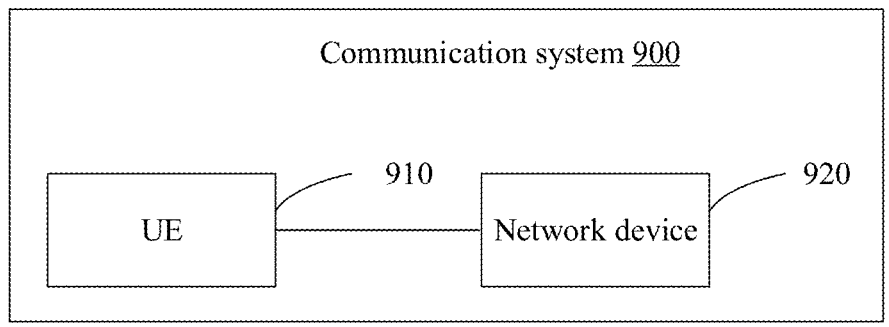
FIG. 9 is a schematic block diagram of a communication system according to an embodiment of the present disclosure.

FIG. 9 is a schematic block diagram of a communication system 900 provided by an embodiment of the present disclosure. As illustrated in FIG. 9, the communication system 900 includes UE 910 and a network device 920.

The UE 910 can be used to realize the corresponding functions realized by the UE in the above method, and the network device 920 can be used to realize the corresponding functions realized by the network device in the above method. For the sake of simplicity, it will not be elaborated here.

It is to be understood that the processor in the embodiment of the disclosure may be an integrated circuit chip and has a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device in the embodiment of the present disclosure, and the computer program enables the computer to execute the corresponding processes implemented by the network device in the various methods of the embodiment of the present disclosure. For the sake of brevity, it will not be repeated here.

Optionally, the computer-readable storage medium can be applied to the mobile terminal/UE in the embodiment of the present disclosure, and the computer program enables the computer to execute the corresponding processes implemented by the mobile terminal/UE in the various methods of the embodiment of the present disclosure. For the sake of brevity, it will not be repeated here.

The embodiment of the present disclosure also provides a computer program product, including a computer program instruction.

Optionally, the computer program product can be applied to the network device in the embodiments of the present disclosure, and the computer program instruction enables the computer to execute the corresponding processes implemented by the network device in the various methods of the embodiment of the disclosure. For the sake of brevity, it will not be repeated here.

Optionally, the computer program product can be applied to the mobile terminal/UE in the embodiments of the present disclosure, and the computer program instruction enables the computer to execute the corresponding process implemented by the mobile terminal/UE in the various methods of the embodiment of the disclosure, for the sake of brevity, it will not be repeated here.

The embodiment of the present disclosure also provides a computer program.

Optionally, the computer program can be applied to the network device in the embodiments of the present disclosure. When the computer program runs on the computer, the computer executes the corresponding process realized by the network device in each method of the embodiment of the disclosure. For the sake of brevity, it will not be described here.

Optionally, the computer program can be applied to the mobile terminal/UE in the embodiments of the present disclosure. When the computer program runs on the computer, the computer executes the corresponding process realized by the mobile terminal/UE in the various methods of the embodiment of the disclosure. For the sake of brevity, it will not be elaborated here.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the disclosure. The above mentioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A reference signal determination method, comprising:
receiving, by User Equipment (UE), first configuration information, wherein the first configuration information is used for determining configuration information of a Sounding Reference Signal (SRS) resource set, the configuration information of the SRS resource set comprises first indication information for indicating an index of a first reference signal source, and the first reference signal resource is used for estimating a pathloss of a first SRS resource of the SRS resource set, wherein when the first SRS resource is a semi-persistent SRS resource, the method further comprises:

in a case where the UE receives a first activation command for activating the first SRS resource, in response to that the first activation command contains second indication information for indicating an index of a second reference signal resource, estimating, by the UE, the pathloss of the first SRS resource based on the index of the second reference signal source, which is indicated by the second indication information; or in response to that the first activation command does not contain the second indication information for indicating the index of the second reference signal resource, estimating, by the UE, the pathloss of the first SRS resource based on the index of the first reference signal source, which is indicated by the first indication information; or wherein when the first SRS resource is an aperiodic SRS resource, the method further comprises:

receiving, by the UE, a second Media Access Control Control Element (MAC CE) command that contains spatial relation assumptions, the spatial relation assumptions being used for determining spatial relation information of SRS resources in the SRS resource set, wherein the spatial relation assumptions are provided by a list of reference signal Identifiers (IDs), in response to that the second MAC CE command contains third indication information for indicating an index of a third reference signal resource, estimating, by the UE, the pathloss of the first SRS resource based on the index of the third reference signal source, which is indicated by the third indication information; or in response to that the second MAC CE command does not contain third indication information for indicating an index of a third reference signal resource, estimating, by the UE, the pathloss of the first SRS resource based on the index of the first reference signal source, which is indicated by the first indication information.

2. The method of claim 1, further comprising:

in a case where the UE does not receive the first activation command, and in response to that the configuration information of the SRS resource set does not comprise the first indication information, estimating, by the UE, the pathloss of the first SRS resource based on a third reference signal resource, the third reference signal resource being a reference signal resource used to obtain Master System Information (MIB); or estimating, by the UE, the pathloss of the first SRS resource based on a fourth reference signal resource, the fourth reference signal resource being configured through a first Transmission Configuration Indicator-state (TCI-state).

3. The method of claim 2, wherein the first TCI-state is used for determining a downlink beam of a Physical Downlink Shared Channel (PDSCH), wherein the PDSCH is used for carrying the first activation command.

4. The method of claim 2, wherein the first TCI-state is used for determining a downlink beam of a Control Resource Set (CORESET), wherein the CORESET is used for transmitting scheduling information of a PDSCH carrying the first activation command.

5. The method of claim 1, further comprising:

in a case where the UE does not receive the second MAC CE command, and in response to that the configuration information of the SRS resource set does not comprise the first indication information, estimating, by the UE, the pathloss of the first SRS resource based on a third reference signal resource, the third reference signal resource being a reference signal resource used to obtain MIB; or estimating, by the UE, the pathloss of the first SRS resource based on a fourth reference signal resource, the fourth reference signal resource being configured through a first TCI-state.

6. The method of claim 5, wherein the first TCI-state is used for determining a downlink beam of a CORESET, wherein the CORESET is used for transmitting first Downlink control information (DCI) for triggering transmission of the first SRS resource.

7. A reference signal determination device for User Equipment (UE), comprising:

a memory storing processor-executable instructions; and
a processor configured to execute the stored processor-executable instructions to perform an operation of:

receiving first configuration information, wherein the first configuration information is used for determining configuration information of a Sounding Reference Signal (SRS) resource set, the configuration information of the SRS resource set comprises first indication information for indicating an index of a first reference signal source, and the first reference signal resource is used for estimating a pathloss of a first SRS resource of the SRS resource set, wherein when the first SRS resource is a semi-persistent SRS resource, the processor is configured to execute the stored processor-executable instructions to further perform operations of:

in a case where the UE receives a first activation command for activating the first SRS resource, in response to that the first activation command contains second indication information for indicating an index of a second reference signal resource, estimating the pathloss of the first SRS resource based on the index of the second reference signal source, which is indicated by the second indication information; or in response to that the first activation command does not contain the second indication information for indicating the index of the second reference signal resource, estimating the pathloss of the first SRS resource based on the index of the first reference signal source, which is indicated by the first indication information; or wherein when the first SRS resource is an aperiodic SRS resource, the processor is configured to execute the stored processor-executable instructions to further perform operations of:

receiving a second Media Access Control Control Element (MAC CE) command that contains spatial relation assumptions, the spatial relation assumptions being used for determining spatial relation information of SRS resources in the SRS resource set, wherein the spatial relation assumptions are provided by a list of reference signal Identifiers (IDs), in response to that the second MAC CE command contains third indication information for indicating an index of a third reference signal resource, estimating the pathloss of the first SRS resource based on the index of the third reference signal source, which is indicated by the third indication information; or in response to that the second MAC CE command does not contain third indication information for indicating an index of a third reference signal resource, estimating the pathloss of the first SRS resource based on the index of the first reference signal source, which is indicated by the first indication information.

8. The device of claim 7, wherein the processor is configured to execute the stored processor-executable instructions to further perform operations of:

in a case where the UE does not receive the first activation command, and in response to that the configuration information of the SRS resource set does not comprise the first indication information, estimating the pathloss of the first SRS resource based on a third reference signal resource, the third reference signal resource being a reference signal resource used to obtain Master System Information (MIB); or estimating the pathloss of the first SRS resource based on a fourth reference signal resource, the fourth reference signal resource being configured through a first Transmission Configuration Indicator-state (TCI-state).

9. The device of claim 8, wherein
the first TCI-state is used for determining a downlink beam of a Physical Downlink Shared Channel (PDSCH), wherein the PDSCH is used for carrying the first activation command.

10. The device of claim 8, wherein
the first TCI-state is used for determining a downlink beam of a Control Resource Set (CORESET), wherein the CORESET is used for transmitting scheduling information of a PDSCH carrying the first activation command.

11. The device of claim 7, wherein the processor is configured to execute the stored processor-executable instructions to further perform operations of:

in a case where the UE does not receive the second MAC CE command, and in response to that the configuration information of the SRS resource set does not comprise the first indication information, estimating the pathloss of the first SRS resource based on a third reference signal resource, the third reference signal resource being a reference signal resource used to obtain MIB; or estimating the pathloss of the first SRS resource based on a fourth reference signal resource, the fourth reference signal resource being configured through a first TCI-state.

12. The device of claim 11, wherein
the first TCI-state is used for determining a downlink beam of a CORESET, wherein the CORESET is used for transmitting first Downlink control information (DCI) for triggering transmission of the first SRS resource.

13. A non-transitory computer-readable storage medium having stored thereon computer-executable instructions that, when executed by a processor of User Equipment (UE), cause the processor to perform a reference signal determination method, the method comprising:

receiving, by the UE, first configuration information, wherein the first configuration information is used for determining configuration information of a Sounding Reference Signal (SRS) resource set, the configuration information of the SRS resource set comprises first indication information for indicating an index of a first reference signal source, and the first reference signal resource is used for estimating a pathloss of a first SRS resource of the SRS resource set, wherein when the first SRS resource is a semi-persistent SRS resource, the method further comprises:

in a case where the UE receives a first activation command for activating the first SRS resource, in response to that the first activation command contains second indication information for indicating an index of a second reference signal resource, estimating, by the UE, the pathloss of the first SRS resource based on the index of the second reference signal source, which is indicated by the second indication information; or in response to that the first activation command does not contain the second indication information for indicating the index of the second reference signal resource, estimating, by the UE, the pathloss of the first SRS resource based on the index of the first reference signal source, which is indicated by the first indication information; or wherein when the first SRS resource is an aperiodic SRS resource, the method further comprises:

receiving, by the UE, a second Media Access Control Control Element (MAC CE) command that contains spatial relation assumptions, the spatial relation assumptions being used for determining spatial relation information of SRS resources in the SRS resource set, wherein the spatial relation assumptions are provided by a list of reference signal Identifiers (IDs), in response to that the second MAC CE command contains third indication information for indicating an index of a third reference signal resource, estimating, by the UE, the pathloss of the first SRS resource based on the index of the third reference signal source, which is indicated by the third indication information; or in response to that the second MAC CE command does not contain third indication information for indicating an index of a third reference signal resource, estimating, by the UE, the pathloss of the first SRS resource based on the index of the first reference signal source, which is indicated by the first indication information.

14. The storage medium of claim 13, wherein the method further comprises:

in a case where the UE does not receive the first activation command, and in response to that the configuration information of the SRS resource set does not comprise the first indication information, estimating, by the UE, the pathloss of the first SRS resource based on a third reference signal resource, the third reference signal resource being a reference signal resource used to obtain Master System Information (MIB); or estimating, by the UE, the pathloss of the first SRS resource based on a fourth reference signal resource, the fourth reference signal resource being configured through a first Transmission Configuration Indicator-state (TCI-state).

15. The storage medium of claim 14, wherein
the first TCI-state is used for determining a downlink beam of a Physical Downlink Shared Channel (PDSCH), wherein the PDSCH is used for carrying the first activation command.

16. The storage medium of claim 14, wherein
the first TCI-state is used for determining a downlink beam of a Control Resource Set (CORESET), wherein the CORESET is used for transmitting scheduling information of a PDSCH carrying the first activation command.

17. The storage medium of claim 13, wherein the method further comprises:
in a case where the UE does not receive the second MAC CE command, and in response to that the configuration information of the SRS resource set does not comprise the first indication information,
estimating, by the UE, the pathloss of the first SRS resource based on a third reference signal resource, the third reference signal resource being a reference signal resource used to obtain MIB; or
estimating, by the UE, the pathloss of the first SRS resource based on a fourth reference signal resource, the fourth reference signal resource being configured through a first TCI-state.

18. The storage medium of claim 17, wherein
the first TCI-state is used for determining a downlink beam of a CORESET, wherein the CORESET is used for transmitting first Downlink control information (DCI) for triggering transmission of the first SRS resource.

* * * * *